United States Patent [19]
Fukutomi

[11] Patent Number: 5,568,451
[45] Date of Patent: Oct. 22, 1996

[54] COMPACT ELECTRONIC APPARATUS

[75] Inventor: Hiroshi Fukutomi, Osaka, Japan

[73] Assignee: Sharp Kabushiki Kaisha, Japan

[21] Appl. No.: 79,818

[22] Filed: Jun. 22, 1993

[30] Foreign Application Priority Data

Jun. 24, 1992 [JP] Japan .................................. 4-166423
Jun. 30, 1992 [JP] Japan .................................. 4-173338

[51] Int. Cl.⁶ .......................... G04B 47/00; G04B 19/24; G06F 3/14; G06F 15/00
[52] U.S. Cl. ............................ 368/10; 368/29; 368/43; 364/705.08; 395/156; 395/159; 395/926
[58] Field of Search ............................ 368/28–29, 41–43, 368/82–84, 10, 239–242; 364/401, 518, 705.07, 705.08, 569; 395/144–161, 926

[56] References Cited

U.S. PATENT DOCUMENTS

| 5,165,012 | 11/1992 | Crandall et al. .................. | 395/100 |
| 5,220,540 | 6/1993 | Nishida et al. ..................... | 368/41 |
| 5,247,438 | 9/1993 | Subas et al. ....................... | 364/400 |

FOREIGN PATENT DOCUMENTS

| 0344803A3 | 12/1989 | European Pat. Off. . |
| 0406895A3 | 9/1991 | European Pat. Off. . |
| 56-35085 | 4/1981 | Japan . |

OTHER PUBLICATIONS

IBM Technical Disclosure Bulletin, vol. 34, No. 7A, Dec. 1991, New York US, pp. 71–74, XP255465, "Indicate Items Changed When Printing an Electronic Calendar".

Research Disclosure, N. 33447, Feb. 1992, Emsworth GB, XP291230, "Interactive Priority Change in Composite Calendar Graph".

IBM Technical Disclosure Bulletin, vol. 34, No. 8, Jan. 1992, New York US, p. 274, XP302119, "Intentional Daily Calendar Items".

*Primary Examiner*—Vit W. Miska
*Attorney, Agent, or Firm*—Nixon & Vanderhye

[57] ABSTRACT

A compact electronic apparatus includes a storage section for storing a piece of input data for each item; a display section for displaying the piece of input data for each item; and a data changing section for causing a mark to be included in the displayed piece of input data so as to indicate that the item is a particular one. Moreover, the piece of input data may arbitrarily include time data regarding a time of each item; and the display section may display a piece of input data including time data which corresponds to a prescribed period having a particular time or a period previous to the prescribed period along with a piece of input data including no time data.

20 Claims, 13 Drawing Sheets

DAILY DISPLAY KEY
IS PRESSED

FORWARD KEY
IS PRESSED

CHECKING OPERATION
KEY
IS PRESSED

BACKWARD KEY
IS PRESSED

DAILY DISPLAY KEY
IS PRESSED

FORWARD KEY
IS PRESSED

FORWARD KEY
IS PRESSED

BACKWARD KEY
IS PRESSED

COMPACT ELECTRONIC APPARATUS

BACKGROUND OF THE INVENTION

1. Field of the Invention

The present invention relates to a compact electronic apparatus, and more particularly to a compact electronic apparatus capable of storing various input data, such as an electronic notebook.

2. Description of the Related Art

A compact electronic apparatus comprising a plan managing function, such as an electronic notebook has been widely used. The plan managing function herein means a function for managing plans, for example an appointment, a homework assignment or the like having a time limit, priority order, etc. A piece of data for each plan, including fields of "contents", "time limit", "priority order", and the like is herein called a piece or record of plan data, and can conventionally be input into and stored in the electronic apparatus utilizing the plan managing function. Such a conventional compact electronic apparatus commonly comprises a display device, and thus the piece of plan data stored therein can arbitrarily be called and displayed by the display device.

For displaying the input piece of plan data, a daily display function, a weekly display function, or the like is utilized. In cases of the daily display function, pieces of plan data whose "time limit" corresponds to the same day are displayed when that day is called. In cases of the weekly display function, pieces of plan data whose "time limit" corresponds to the same week are displayed when that week is called.

An exemplary plan management function of a conventional electronic notebook will be described below referring to FIGS. 11 to 14. Herein, each piece of plan data includes three fields of "contents", "time limit", and "priority order".

First, a case of inputting a piece of plan data for a plan to be managed into the conventional compact electronic apparatus will be described referring to the flow chart of FIG. 11. As is illustrated in FIG. 11, guidance is displayed by a display device indicating that the field of "contents" should be input (step S101a); accordingly, the field of "contents" is input using a keyboard device (step S102a); and then the enter key is pressed for affirming the field of "contents" (step S103a). This process will be repeated until every field is input. The remaining fields, in this case, fields of "time limit" and "priority order" are input at steps S101b to 8103b, and at steps S101c to S103c, respectively, as is illustrated in FIG. 11. If all the fields are input, the input pieces of plan data is transferred to a predetermined area of a RAM provided in the compact electronic apparatus and is stored therein (step S104). Finally, the input piece of plan data is displayed by the display device (step S105). The stored piece of plan data can be amended through the same process as has been input. Moreover, in cases of pieces of plan data for plans having no time limit, steps S101b to S103b may be skipped so as to leave the field of "time limit" blank.

Next, cases of calling each stored piece of plan data will be described. As is shown in FIG. 12, pressing a forward key when an initial display D101 appears, a piece of plan data for one plan will be displayed (see display D102). For calling another piece of plan data, the forward key will be pressed once again. For calling the previous piece of plan data, a backward key will be pressed. Herein, the pieces of plan data will be called in order of "time limit". In cases where two or more pieces of plan data have the same "time limit", the pieces of plan data are displayed in order of "priority order" (see displays D103 and D104 of FIG. 12).

Cases for calling stored pieces of plan data utilizing a daily display function will be described below referring to FIGS. 13 and 14. FIG. 13 is an exemplary flow chart in a case utilizing the daily display function. FIG. 14 is a view exemplarily showing how the display is changed according as the daily display function proceeds.

First, a daily display key is pressed (step S201); a data set in a clock functioning section is transferred to a data counter provided in the RAM (step S202); and contents of the data counter are transferred to a display buffer (step S203). Next, it is detected whether there are one or more pieces of plan data whose "time limit" corresponds to a data designated by the data counter (step S204). In cases where it is detected that there are such pieces of plan data at step S204, the pieces of plan data are transferred to the display buffer provided in the RAM (step S205); and then the contents of the display buffer are displayed (step S206). On the other hand, in cases where it is detected that there are no such pieces of plan data at step S204, the contents transferred from the data counter to the display buffer at step S203 are displayed (step S206). As is shown in the display D111 of FIG. 14, the date designated by the date counter is displayed in the first line, and then pieces of plan data whose "time limit" corresponds to the designated date are displayed in order of their "priority order" from the second line. The fields of "priority order", [1] and [2], are displayed on the left side, and the fields of "contents" are respectively displayed on the corresponding right side.

For displaying one or more pieces of plan data whose "time limit" corresponds to the next day to the date displayed by the display device, the forward key will be pressed. It is detected whether the forward key is pressed; if it is detected that the forward key is pressed (step S207), the date in the date counter is advanced by one day (step S208); and finally the process is returned to step S203. In cases where the forward key is pressed under the condition where the display D111 appears, a display D112 will appear at step S206. That is, the date displayed in the first lane, which indicates "time limit" is changed from "JAN 8, 1992 (WED)" to "JAN 9, 1992 (THU)". Accordingly, a piece of plan data whose "time limit" corresponds to JAN 9th, 1992 will be displayed from the second line. If the forward key is pressed once more, a display D113 appears. That is, the piece of plan data whose "time limit" corresponds to JAN 10th, 1992 will be displayed. Herein, nothing is displayed from the second line in the display D113, which means that there is no plan data whose "time limit" corresponds to that date.

On the contrary, for displaying one or more pieces of plan data whose "time limit" corresponds to the previous day to the date displayed by the display device, the backward key will be pressed. It is detected whether the backward key is pressed (step S209); if it is detected thee the backward key is pressed, the date in the date counter is reduced by one day (step S210); and finally the process is returned to step S203. In cases where the backward key is pressed under the condition where the display D113 appears, e display D114 appears at step S206. That is, the date displayed in the first line, which indicates "time limit", is changed from "JAN 10, 1992 (FRI)" to "JAN 9, 1992 (THU)". Accordingly, a piece of plan data whose "time limit" corresponds to JAN 9th, 1992 will be displayed from the second line.

In cases where the weekly display function is utilized, the same process will be executed except that the date counter designates a week instead of a day, and consequently the week is displayed in the first line of the display, and the piece of plan data corresponding to the week will be displayed from the second line each week.

Such a conventional system has a problem in that even a piece of plan data for a transacted plan is inevitably called along with a piece of plan data for a plan left unattended, so that the user should read all the pieces of plan data including the piece of plan data for the transacted plan and judge which is the piece of plan data for the plan left unattended; and the user cannot confirm an actual transaction date of each transacted plan. Conventionally, there has been proposed a method in which the piece of plan data for the transacted plan is erased by means of marking or the like as disclosed in Japanese Laid-Open Patent Publication No. 56-35085. However, this has a problem in that the piece of plan data once erased cannot be called again by any means.

Furthermore, according to such a conventional system utilizing the daily display function, or the weekly display function, only a piece of plan data whose "time limit" corresponds to the day or week designated by the date counter will be displayed. Therefore, even if there is a piece of plan data whose "time limit" precedes the designated day or week and for which the plan is left unattended, the piece of plan data is not displayed unless the corresponding past day or week is called. Accordingly, there is a possibility that the user will overlook such pieces of plan data.

Moreover, according to such a conventional system, a piece of plan data for a plan having no time limit cannot be confirmed utilizing the daily display function nor weekly display function.

SUMMARY OF THE INVENTION

In accordance with an aspect of this invention, the compact electronic apparatus comprises a storage means for storing a piece of input data for each item; a display means for displaying the piece of input data for each item; and a data changing means for causing a mark to be included in the displayed piece of input data so as to indicate that the item is a particular one.

In accordance with another aspect of this invention, the compact electronic apparatus comprises a storage means for storing input data for each item, the input data including time data regarding a time of the item; and a display means for displaying the input data including time data which corresponds to a prescribed period having a particular time or a period previous to the prescribed period.

In accordance with still another aspect of this invention, the compact electronic apparatus comprises a storage means for storing a piece of input data for each item, the piece of input data arbitrarily including time data regarding a time for each item; and a display means for displaying a piece of input data including time data which corresponds to a prescribed period having a particular time or a period previous to the prescribed period along with a piece of input data including no time data.

According to the compact electronic apparatus of this invention, the data changing means can cause a mark to be included in the piece of input data stored by the storage means so as to indicate that the item is a particular one, so that it is easy to discriminate whether the item of displayed data is a particular one.

When a plan is managed with the compact electronic apparatus of the invention, a mark indicating that the plan has been transacted and time data corresponding to a time when the plan is actually transacted can be included in a piece of plan data for the plan.

According to another compact electronic apparatus of this invention, a piece of input data including time data which corresponds to a prescribed period having a particular time or a period previous to the prescribed period can be selected among pieces of input data stored by the storage means, and then displayed by the display means, so that such a piece of input data can always be displayed.

According to a still another compact electronic apparatus of this invention, a piece of input data for each item can be stored so that the piece of input data arbitrarily includes time data regarding a time thereof. A piece of input data including time data which corresponds to a prescribed period having a particular time or a period previous to the prescribed period can be selected among pieces of input data stored by the storage means, and then displayed by the display means, along with a piece of input data including no time data, so that such a piece of input data can be confirmed together with pieces of input data including no time data.

When a plan is managed with the compact electronic apparatus of the invention utilizing a daily display function or a weekly display function, a piece of plan data whose "time limit" precedes a designated date can be displayed when the designated date is called, by corresponding the "time limit" to the designated date.

Furthermore, the compact electronic apparatus may include a function so that a piece of plan data for a plan having no time limit can be displayed when the designated date is called, so that such piece of plan data can be displayed utilizing the daily display function or weekly display function.

Thus, the invention described herein makes possible the advantages of (1) providing a compact electronic apparatus with which it can be readily discriminated whether a plan of displayed plan data has already been transacted utilizing a plan managing function; (2) providing a compact electronic apparatus with which it can be readily discriminated whether a plan of displayed plan data has already been transacted, and, if the plan has already been transacted, the time when the plan was actually transacted can be confirmed utilizing the plan managing function; (3) providing a compact electronic apparatus with which plan data whose "time limit" precedes a designated date and for which the plan is left unattended can be readily confirmed utilizing a daily display function or weekly display function; and (4) providing a compact electronic apparatus with which plan data for a plan which is left unattended and has no time limit can be readily confirmed utilizing a daily display function or weekly display function.

These and other advantages of the present invention will become apparent to those skilled in the art upon reading and understanding the following detailed description with reference to the accompanying figures.

BRIEF DESCRIPTION OF THE DRAWINGS

FIG. 5 is an exemplary flow chart illustrating the initial operation of the electronic notebook of FIG. 1 after a power source is turned ON.

DESCRIPTION OF THE PREFERRED EMBODIMENTS

Hereinafter, the present invention will be described by way of illustrating an example referring to the figures.

Figure 1:
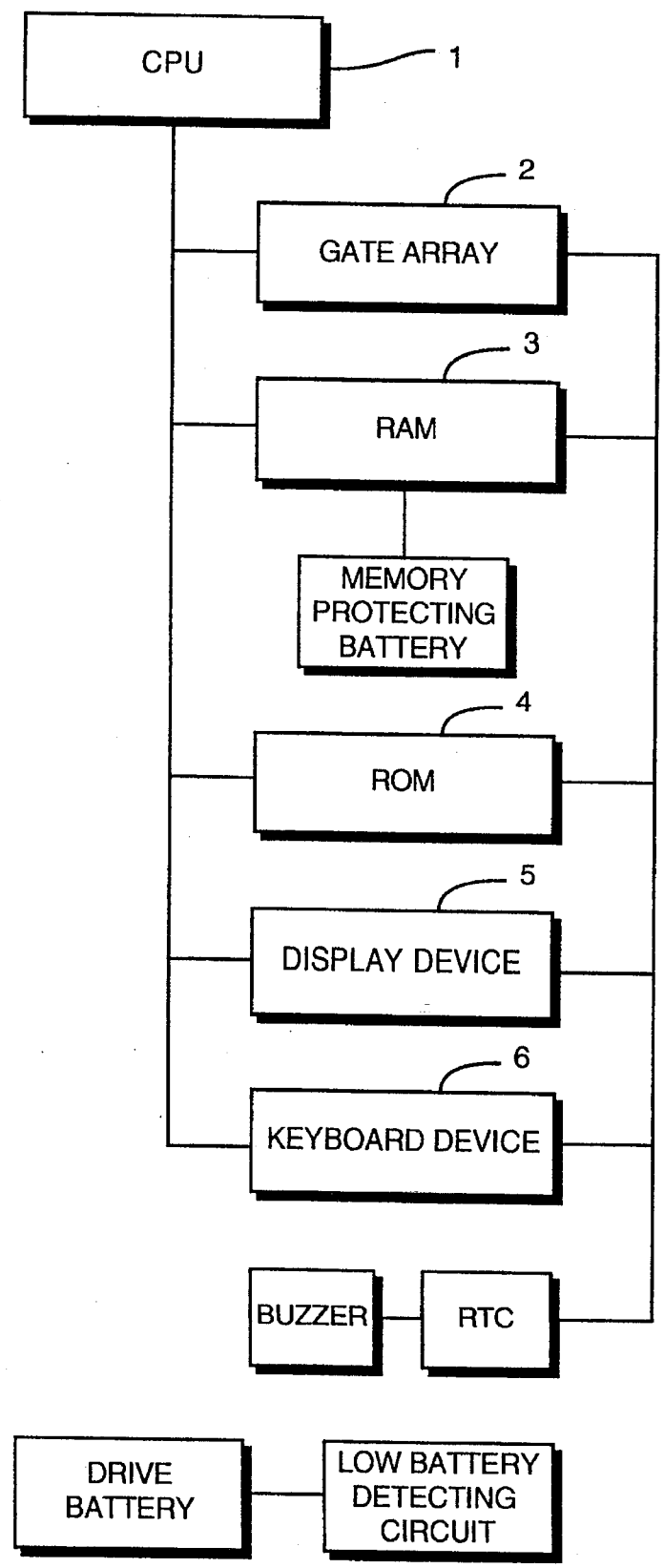
FIG. 1 is a block diagram for exemplary hardware of an electronic notebook according to an embodiment of the present invention.
Figure 2:
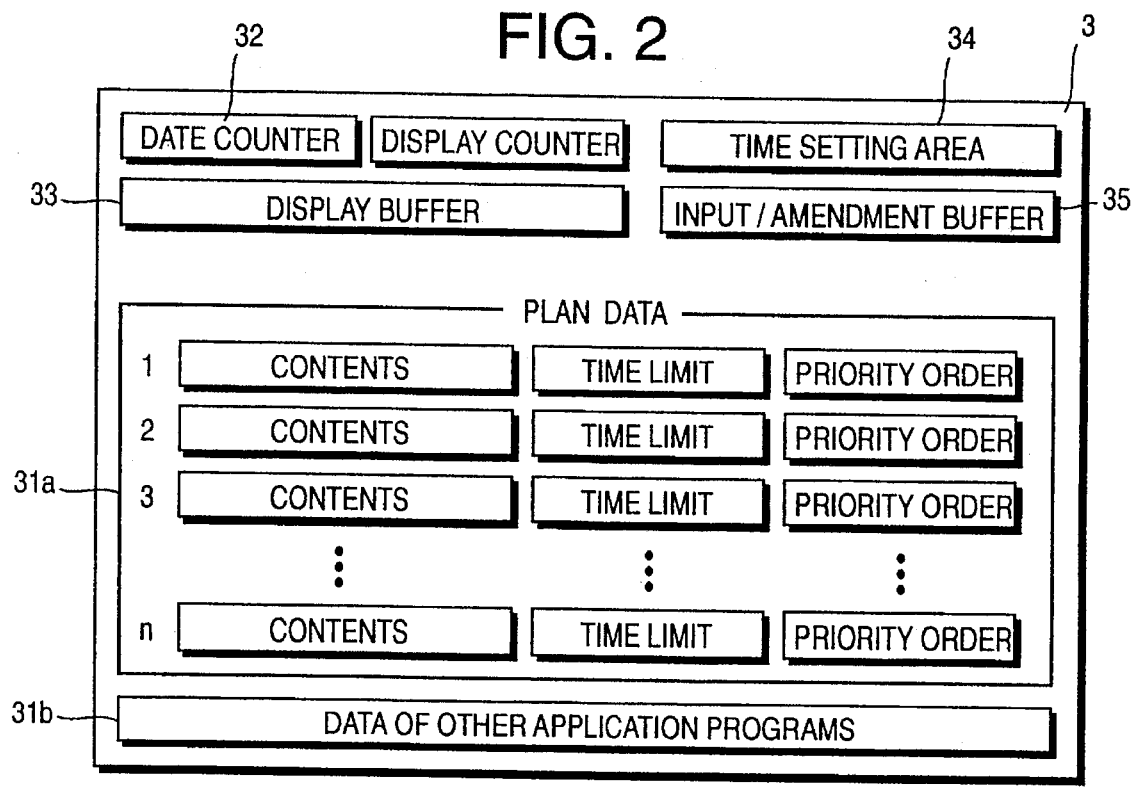
FIG. 2 is a schematic view showing the exemplary structure of a RAM included in the electronic notebook of FIG. 1.
Figure 3:
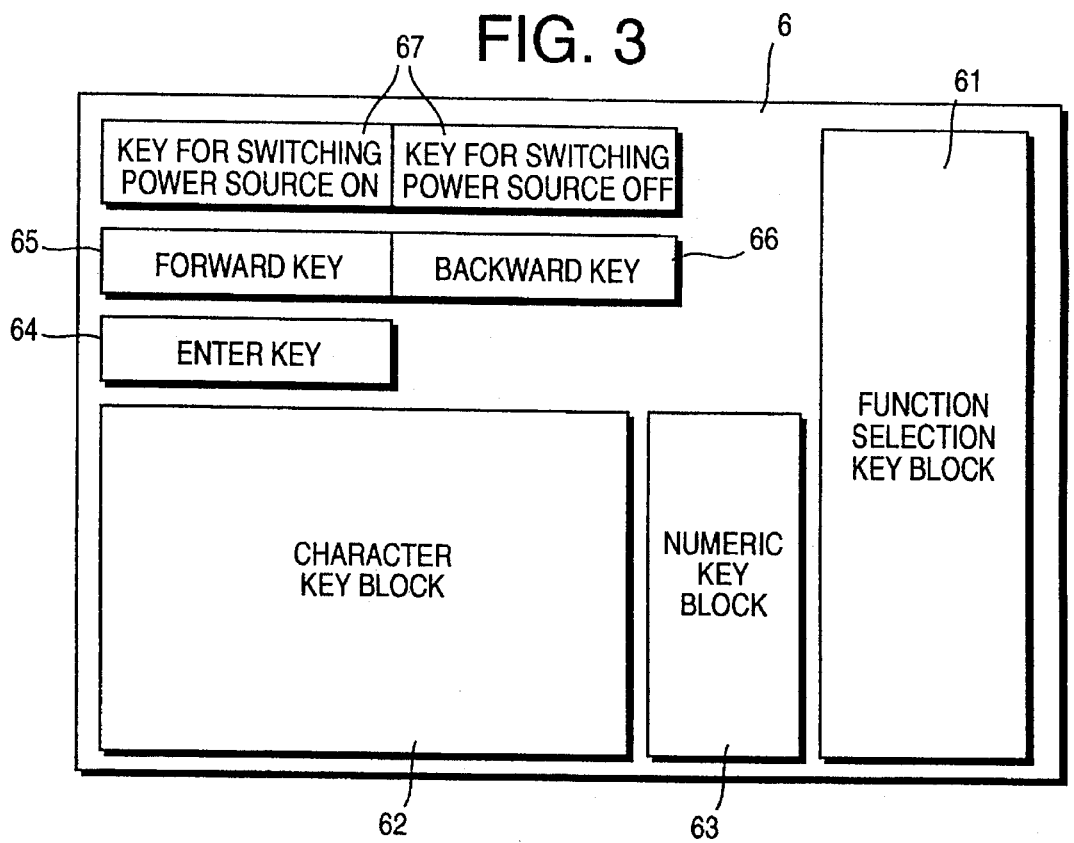
FIG. 3 is a schematic view showing the exemplary structure for a keyboard device included in the electronic notebook of FIG. 1.
Figure 4:
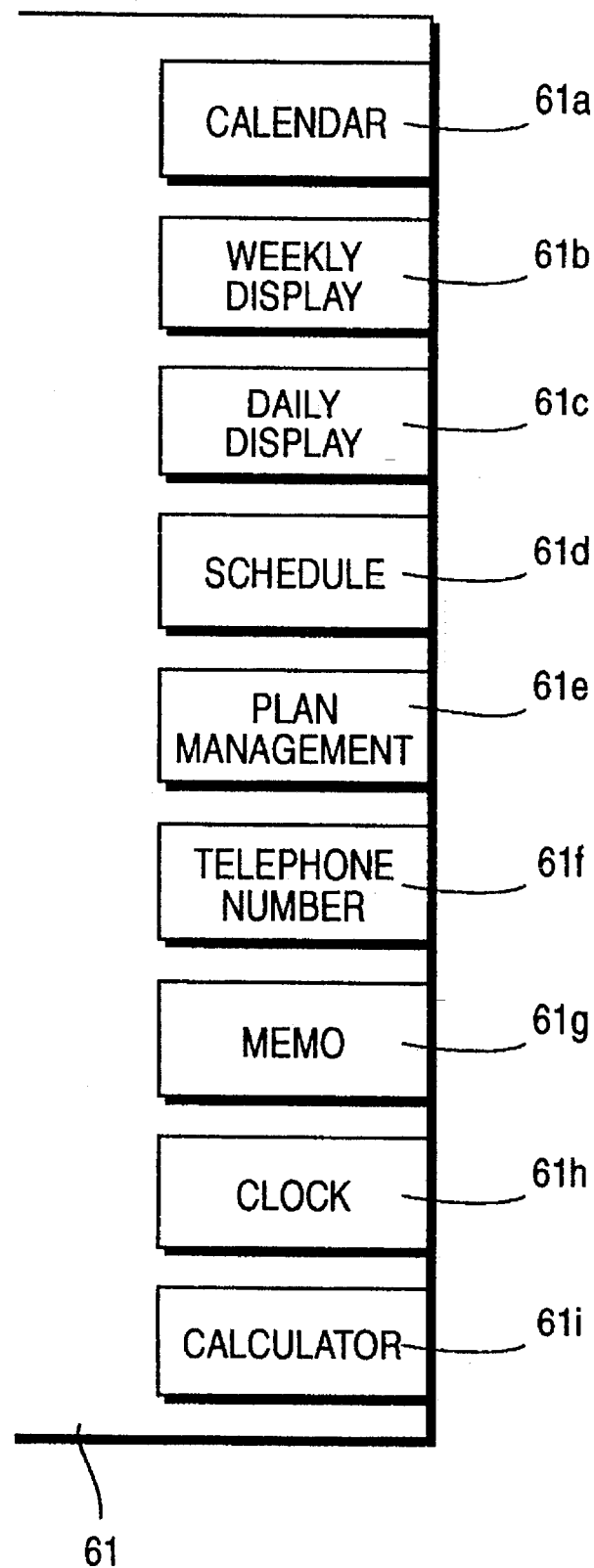
FIG. 4 is a view exemplarily showing function selection keys included in the keyboard device of FIG. 3.

FIG. 1 shows an exemplary structure for the hardware of an electronic notebook. FIG. 2 shows the structure of a RAM included in the electronic notebook. FIG. 3 shows an exemplary structure for a keyboard device included in the electronic notebook. FIG. 4 exemplarily shows function selection keys included on the keyboard device.

As is shown in FIG. 1, the electronic notebook comprises a CPU 1 for controlling the electronic notebook; a gate array 2; a RAM 3 for storing input data; a ROM 4 for storing programs to realize functions of the electronic notebook; and I/O devices such as a display device 5 and a keyboard device 6. All of these are connected with each other.

In the ROM 4, a basic program to realize a basic function of the electronic notebook, for inputting data and displaying the input data, or the like is stored along with a plurality of application programs to realize a plan managing function, a daily display function, and the like.

As is shown in FIG. 2, the RAM 3 comprises areas 31a and 31b for storing variable data indispensable to the application programs; a date counter 32 for designating a date; a display buffer 33 for displaying data and the like; a time setting area 34 for registering a time set in a clock functioning section; and an input/amendment buffer 35 for inputting and/or amending data. In the area 31a, pieces of plan data including fields of "contents", "time limit", and "priority order" can be stored for plans (1 to n).

As is shown in FIG. 3, the keyboard device 6 comprises a function selection key block 61 for initializing one of application programs including the plan managing function; a character key block 62 for inputting characters; a numeric key block 63 for inputting numerals; an enter key 64 for registering data; a forward key 65 and a backward key 66 for calling registered data; and keys 67 for switching a power source of the electronic notebook ON or OFF.

As is shown in FIG. 4, the function selection key block 61 is constituted of 9 function selection keys 61a to 61i. One of the application programs stored in the ROM 4 can be initialized in the case where one of the keys 61a to 61i corresponding to the program is pressed. Herein, the function selection key 61b corresponds to an application program for a weekly display function; the function selection key 61c corresponds to an application program for a daily display function; and the function selection key 61e corresponds to an application program for the plan managing function.

Next, an initial operation of the electronic notebook according to the present example will be described referring FIG. 5.

Figure 5:
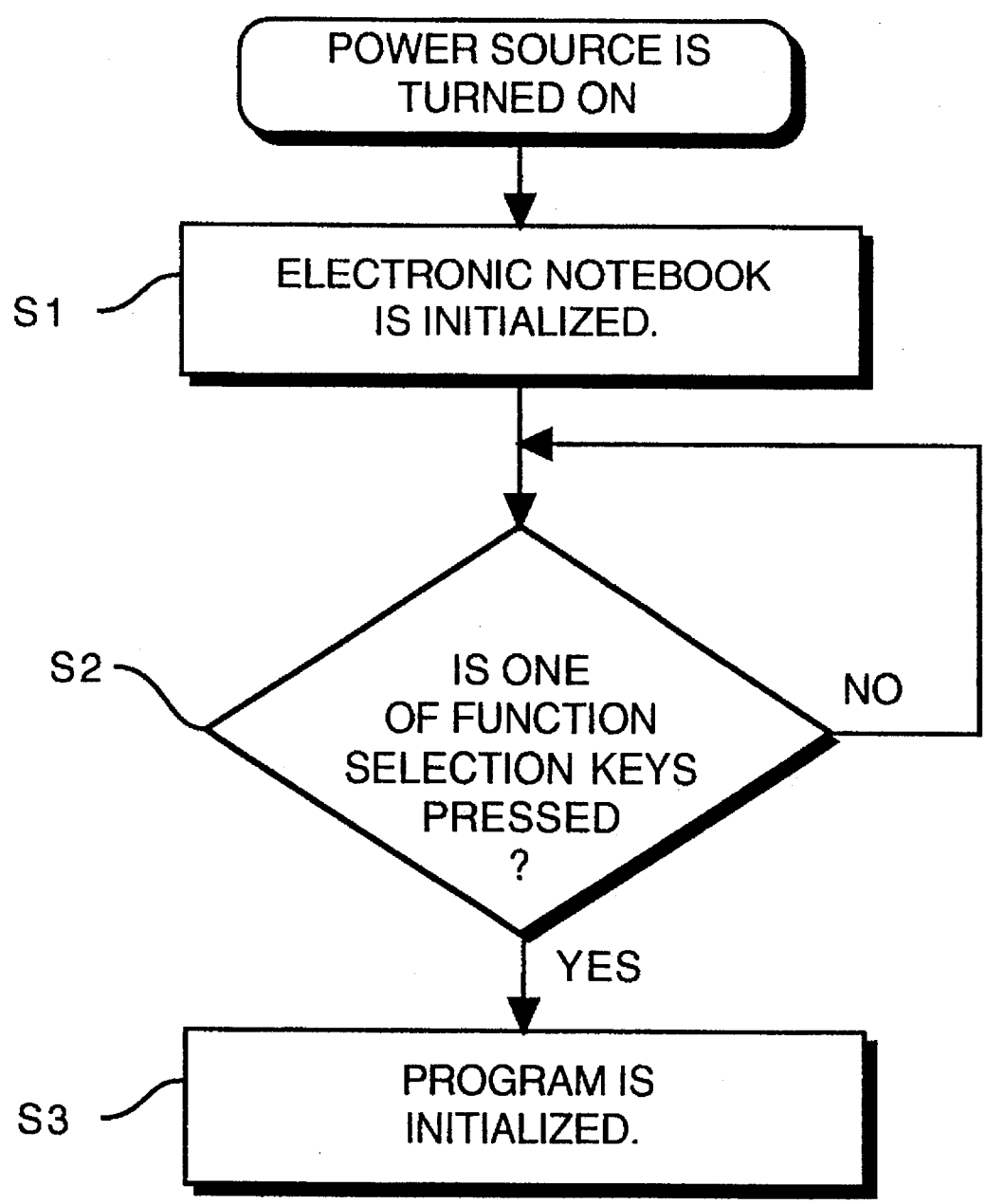

As is illustrated in FIG. 5, when the power source is turned ON, the electronic notebook is initialized (step S1). When one of the function selection keys 61a to 61i is detected as having been pressed (step S2), an application program corresponding to the pressed key is initialized (step S3). Even after the program is initialized, another application program can be initialized by pressing the corresponding function selection key.

Figure 11:
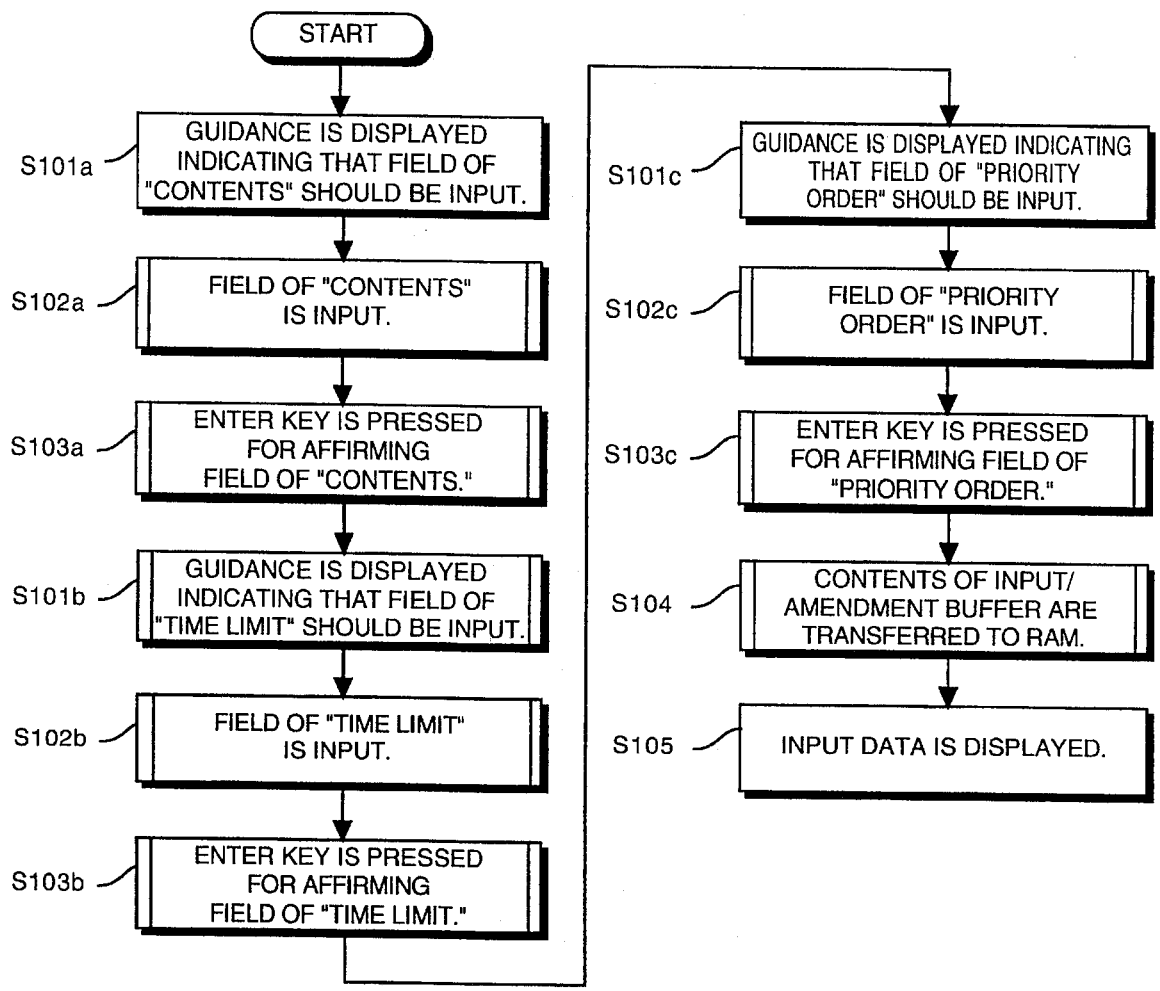
FIG. 11 is an exemplary flow chart illustrating how to input a piece of plan data into a conventional electronic notebook.

When the function selection key 61e is pressed, the application program for the plan managing function is initialized, and the process turns into e mode for inputting a piece or record of plan data. The piece of plan data is generally input in the same manner as has been done conventionally (see FIG. 11).

First, a case wherein each stored piece of plan data is called according to the present invention will be described.

The following operation is executed in order to indicate whether the plan of the called piece of plan data has already been transacted (i.e., accomplished or completed) or not (hereinafter, this operation is referred to as "checking operation").

Figure 6:
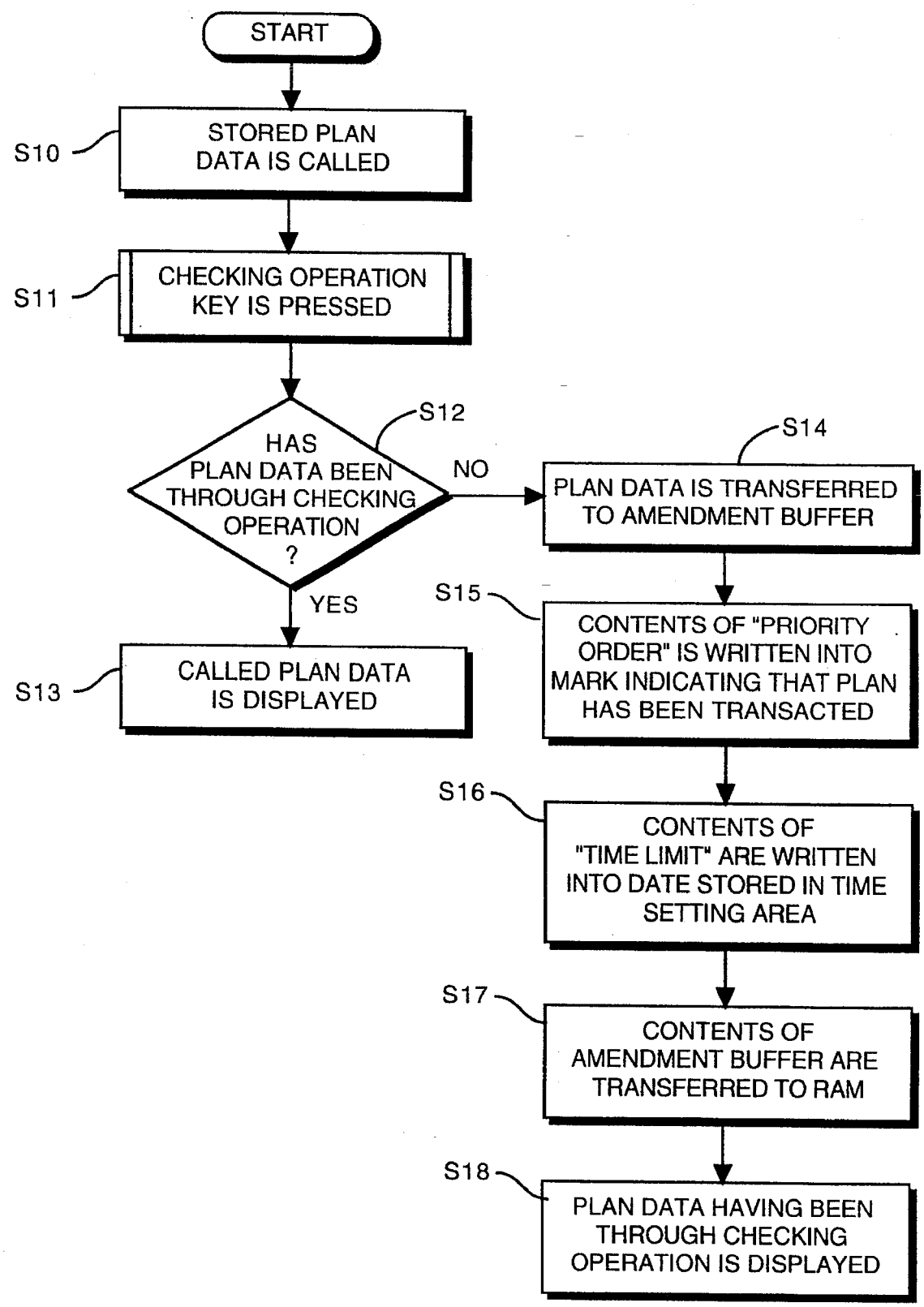
FIG. 6 is an exemplary flow chart illustrating a checking operation for the electronic notebook of FIG. 1.

As is illustrated in FIG. 6, the piece of plan data stored for each plan is called (step S10). When the plan has already been transacted (i.e., accomplished or completed), a checking operation key for starting the checking operation is pressed (step S11). Then, it is detected whether the piece of plan data has already been through the checking operation (step S12). If it is detected that the piece of plan data has already been through the checking operation at step S12, the piece of plan data is displayed by the display device 5 (step S13). Thus, the process is completed.

On the other hand, if it is detected that the piece of plan data has not been through the checking operation at step S12, the piece of plan data is transferred to the amendment buffer 35 (step S14), and then the contents of the field of "priority order" has stored therein into a mark indicating that the plan has been transacted (step S15). Next, the contents of the field of "time limit" are loaded with the data stored in the time setting area 34 included in the RAM 3 (step S16). The contents provisionally stored in the amendment buffer 35 are transferred to the prescribed area 31a included in the RAM 3 (step S17). Finally, the piece of plan data having been through the checking operation is displayed by the display device 5 (step S18).

Figure 7:
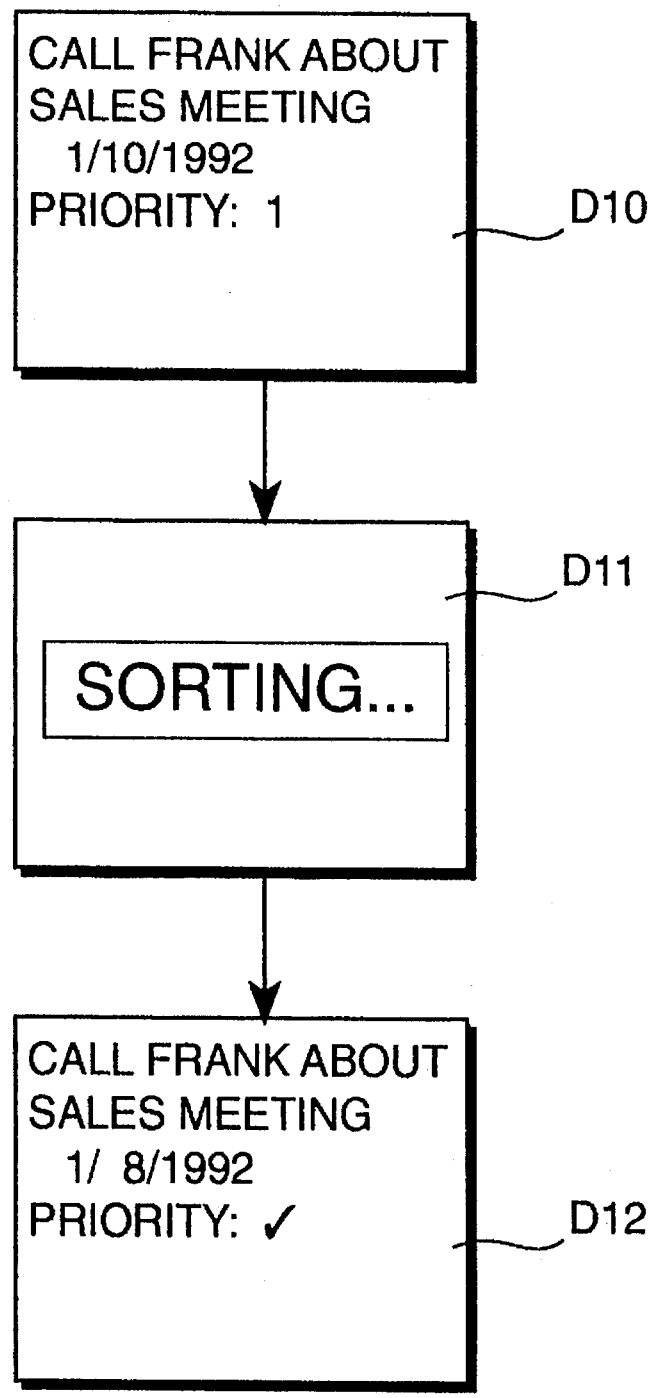
FIG. 7 is a view exemplarily showing how the display is changed as the checking operation of the electronic notebook of FIG. 1 proceeds.

FIG. 7 exemplarily shows how a display of the electronic notebook is changed as the checking operation proceeds, assuming that a date set in the time setting area 34 included in the RAM 3 is JAN 8, 1992.

Figure 12:
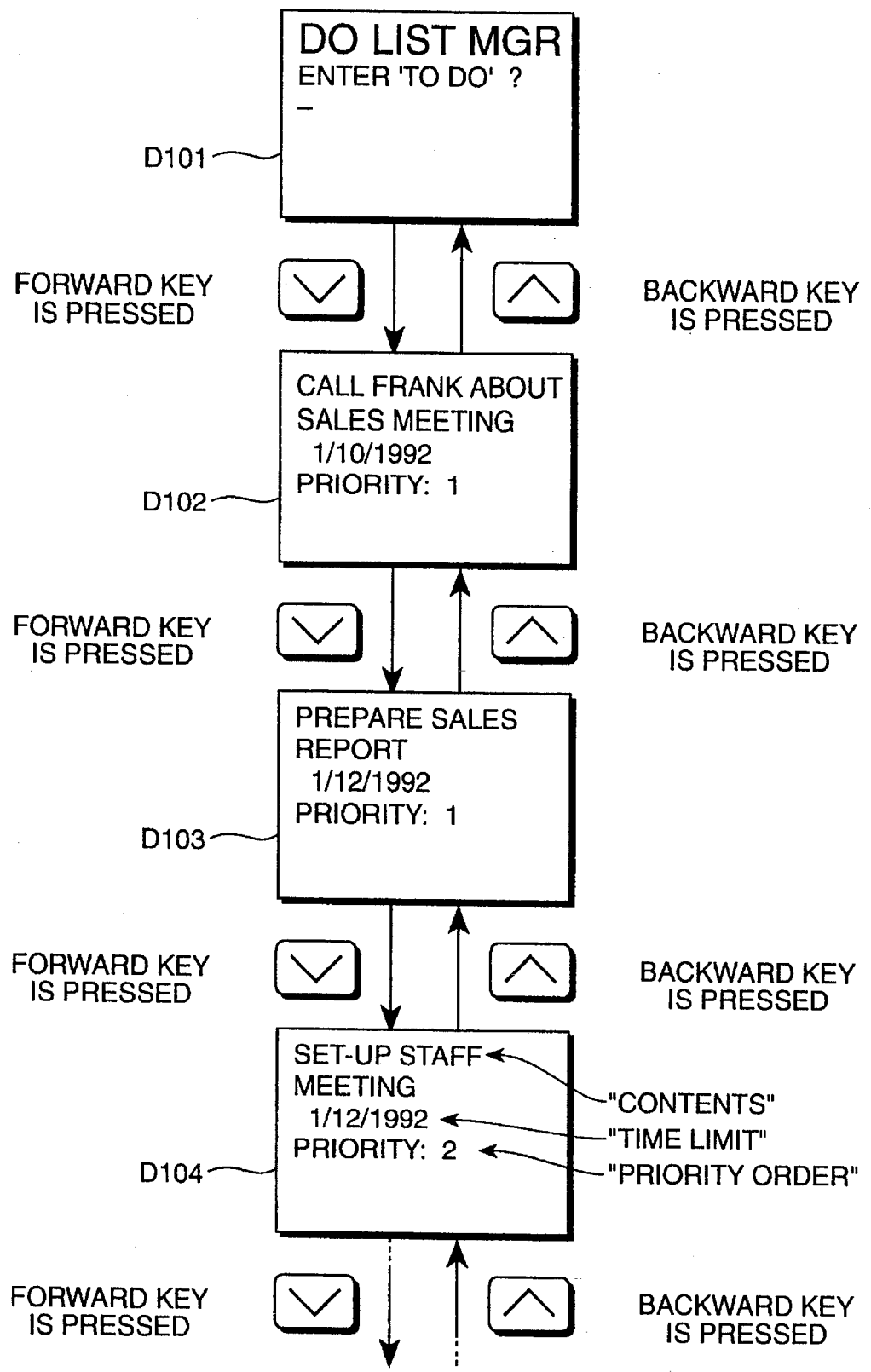
FIG. 12 is a view exemplarily showing how a display is changed as an operation for calling a piece of plan data stored in the conventional electronic notebook proceeds.
Figure 13:
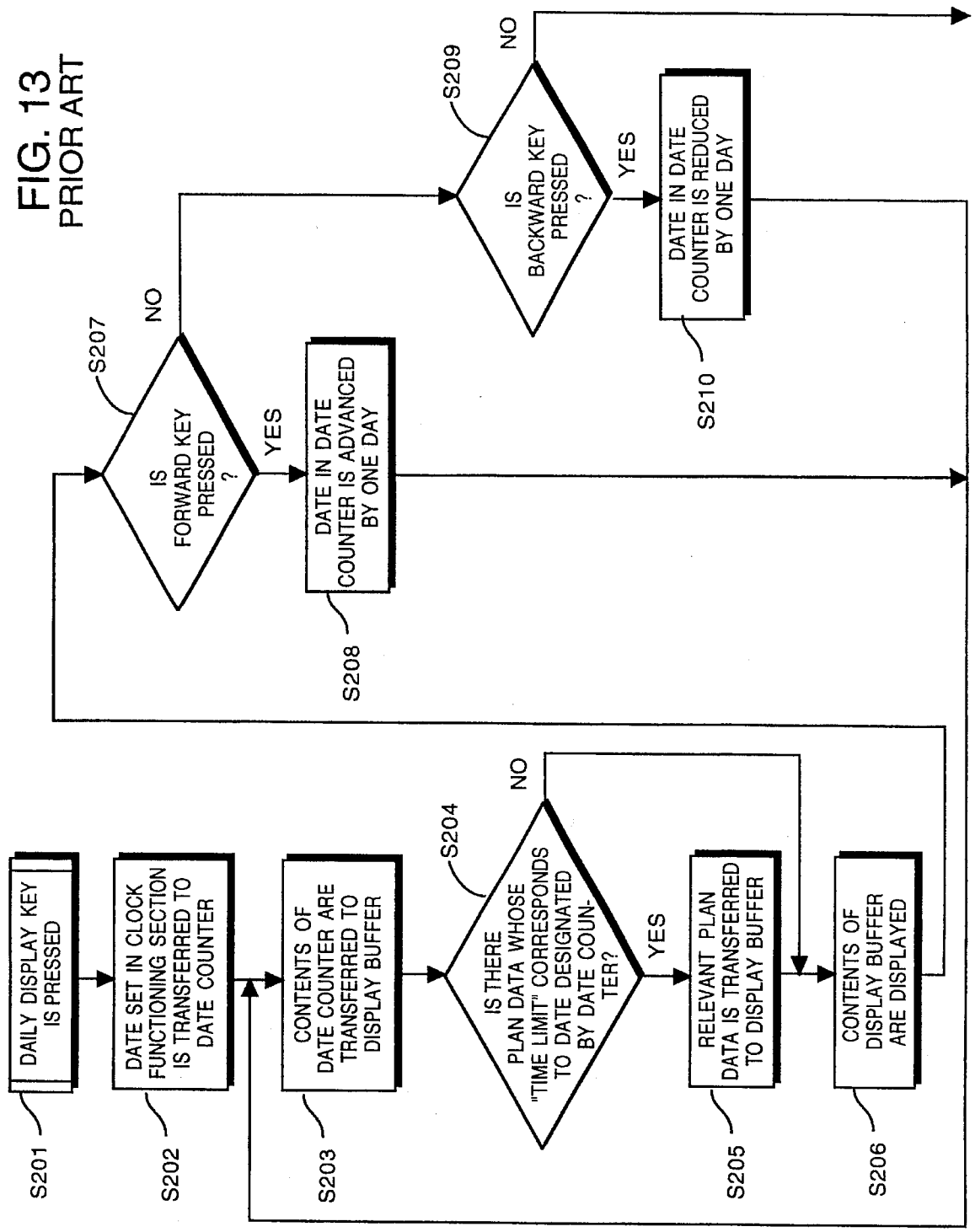
FIG. 13 is an exemplary flow chart illustrating a daily display function for the conventional electronic notebook.
Figure 14:
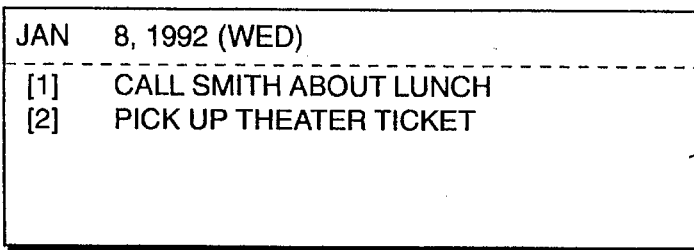
FIG. 14 is a view exemplarily showing how a display is changed as the daily display function of the conventional electronic notebook proceeds.
Figure 14:
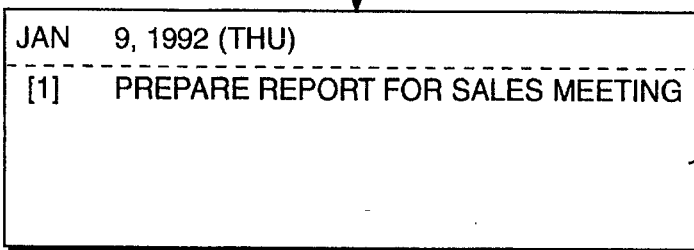
Figure 14:
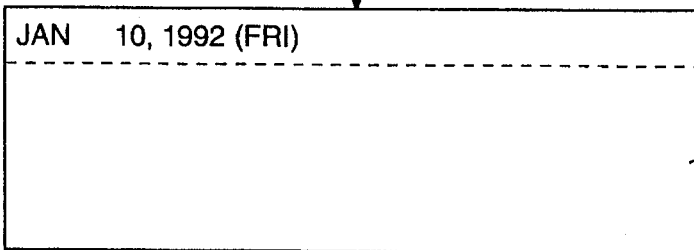
Figure 14:
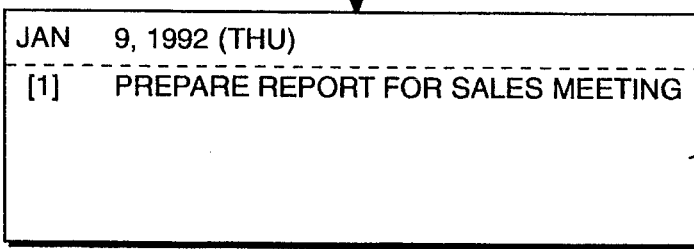

In order to call the piece of plan data stored at step S10, the forward key 65 is pressed under the condition that an initial display D101 of FIG. 12 appears, and then a display D10 of FIG. 7 will appear. When the checking operation key is pressed at step S11 in order to subject the called piece of plan data to the checking operation, steps S12, and S14 to S17 are executed. During this process, the display D11 of FIG. 7 appears. Finally, a display D12 of FIG. 7 appears displaying the piece of plan data having been through the checking operation at step S18.

Through the checking operation, the contents of the field of "time limit" are changed into a set time stored in the RAM 3, herein from Jan. 10, 1992 into Jan. 8, 1992, and the contents of the field of "priority order" are changed into the mark indicating that the plan has been transacted.

The piece of plan data having already been through the checking operation remains unchanged even if the checking operation key is pressed at step S11 as described above.

With such a simple operation, not only the mark indicating that the plan has been transacted but also a date when the plan is actually transacted can be displayed. As a result, the user can judge whether the plan of the called plan data has been transacted or not without confirming the piece of plan data for the plan. Moreover, when the plan has been transacted, the user can also learn the date when the plan was actually transacted. Since the number of the fields included in the piece of plan data for each plan remains unchanged through the checking operation, the piece of plan data according to the present invention remain compatible with a conventional piece of plan data.

According to the present example, the mark indicating that the plan has been transacted is written so as to replace the contents of the field of "priority order", but the present invention is not limited to the above. The mark indicating that the plan has been transacted may be written so as to replace the contents of the field of "time limit", or the like. Furthermore, herein is described a case where the number of fields included in the piece of plan data for each plan is 3, but the present invention can also be applied to a case where 4 or more fields are included.

Figure 8:
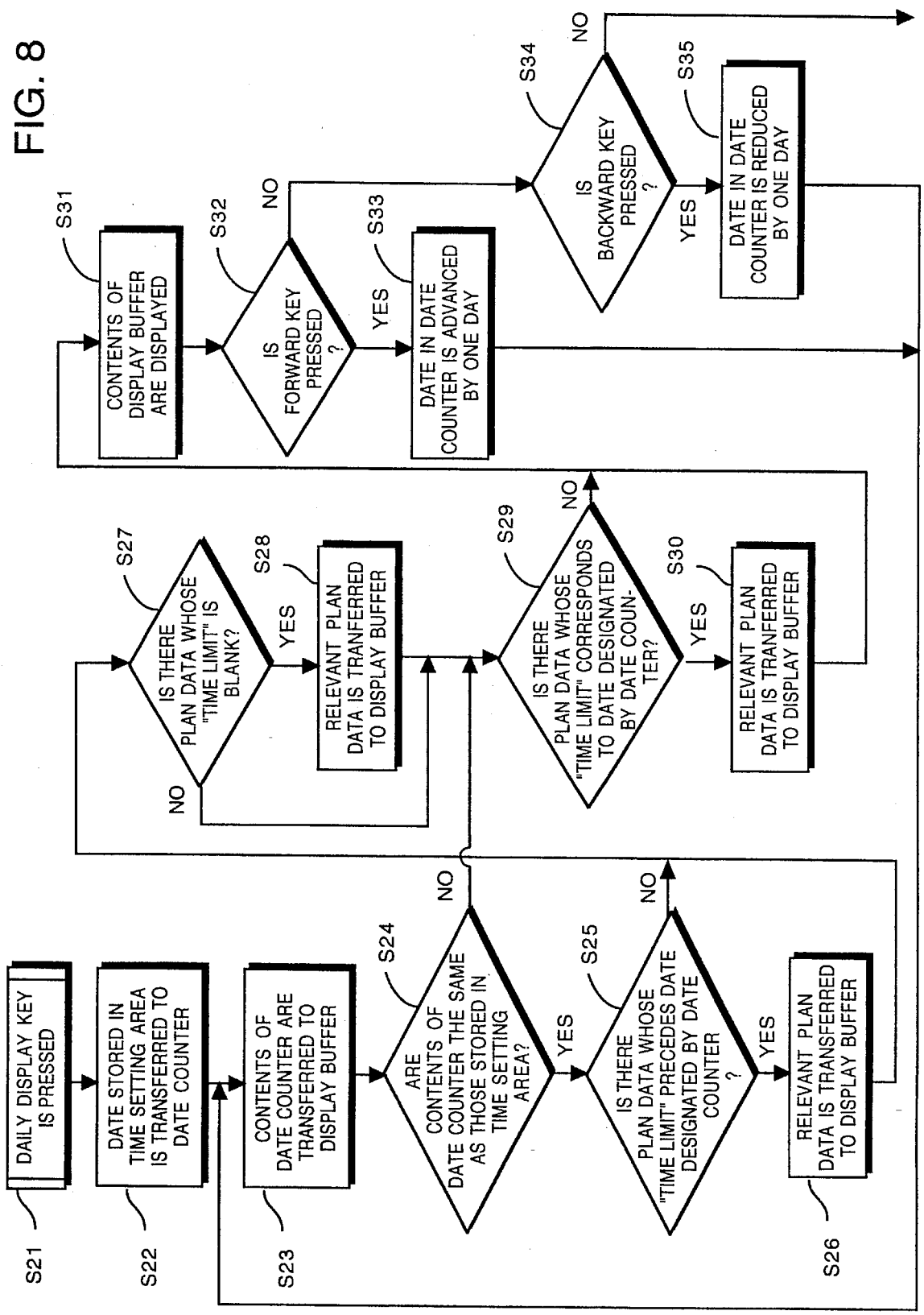
FIG. 8 is an exemplary flow chart illustrating the daily display function of the electronic notebook of FIG. 1.
Figure 9:
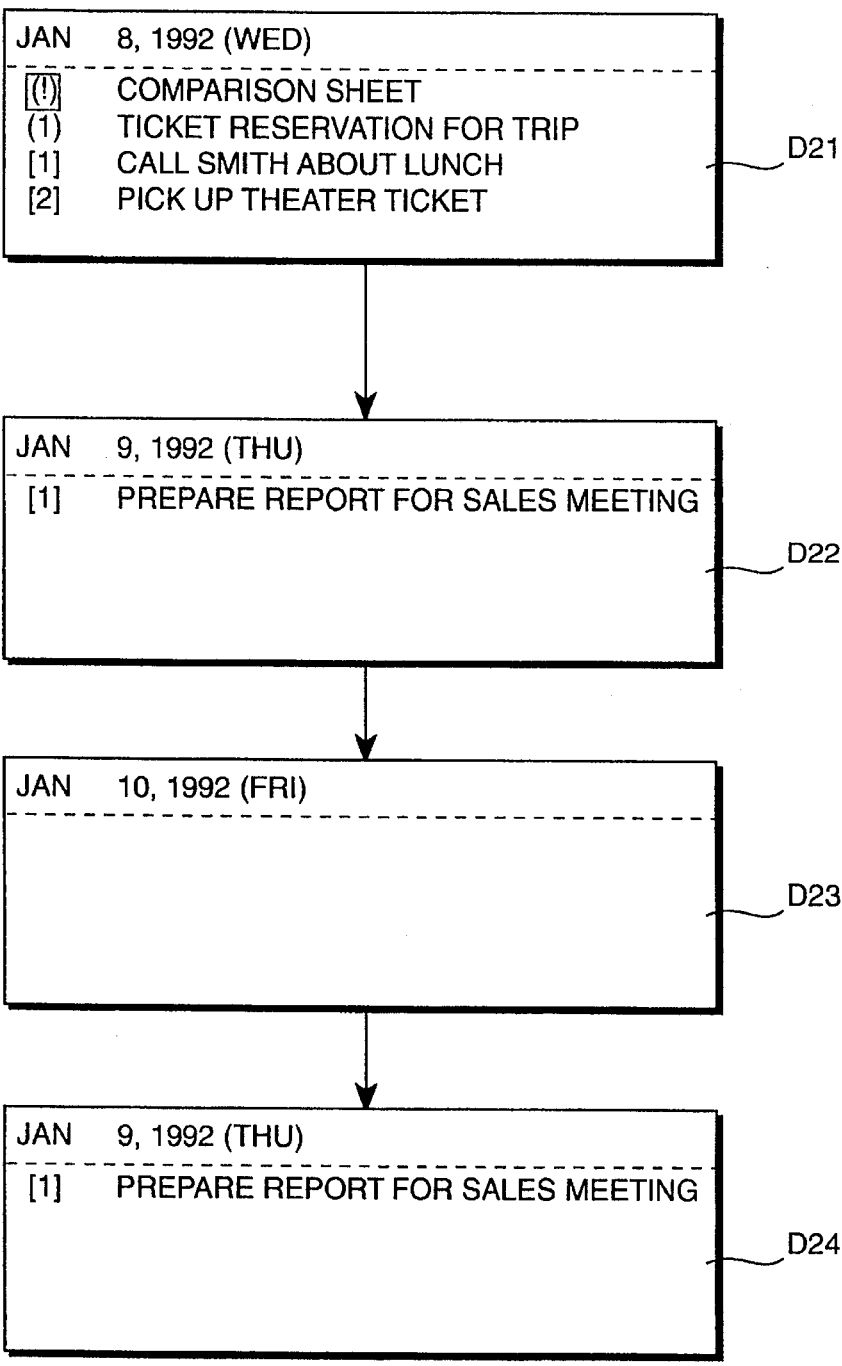
FIG. 9 is a view exemplarily showing how a display is changed as the daily display function of the electronic notebook of FIG. 1 proceeds.

Secondly, a case where a stored piece of plan data is called utilizing the daily display function according to the present invention will be described referring to FIGS. 8 and 9. FIG. 8 illustrates an exemplary flow chart for the daily display function according to the present example. FIG. 9 exemplarily shows how the display is changed as the daily display function proceeds.

First, a daily display key 61c is pressed (step S21); a date stored in the time setting area 34 for registering a set time of the RAM 3 is transferred to the date counter 32 (step S22); and the contents of the date counter 32 are transferred to the display buffer 33 (step S23).

Next, it is detected whether the contents of the date counter 32 are the same as those stored in the time setting area 34 (step S24).

If it is detected that the contents of the date counter 32 are the same as those stored in the time setting area 34, it is detected whether there are one or more pieces of plan data whose "time limit" precedes the date designated by the date counter 32. If it is detected that there are such pieces of plan data, the pieces of plan data are transferred to the display buffer 33 in the RAM 3 at step S26, and then the process proceeds to step S27. On the other hand, if it is detected that there are no such pieces of plan data, the process advances to step S27 skipping step S26.

At step S27, it is detected whether there are one or more pieces of plan data whose "time limit" is blank. If it is detected that there are such pieces of plan data, the pieces of plan data are transferred to the display buffer 33 in the RAM 3 at step S28, and then the process proceeds to step S29. On the other hand, if it is detected that there are no such pieces of plan data, the process advances to step S29 skipping step S28.

On the contrary, if it is detected that the contents of the date counter 32 are different from those stored in the time setting area 34 at step S24, the process advances to step S29 skipping steps S25 to S28.

At step S29, it is detected whether there are one or more pieces of plan data whose "time limit" corresponds to the date designated by the date counter 32. If it is detected that there are such pieces of plan data, the pieces of plan data are transferred to the display buffer 33 in the RAM 3 (step S30); and the contents of the display buffer 33 are displayed by the display device 5 (step S31). If it is detected that there are no such pieces of plan data at step S29, the process advances to step S31 skipping step S30, where the contents of the display buffer 33 are displayed by the display device 5.

A display D21 of FIG. 9 is an exemplary one displayed by the display device 5 at step S31. In the display D21, the field=of "time limit" of the called piece of plan data is shown in the first line, and the fields of "priority order" and "contents" thereof are shown from the second line. There are three kinds of pieces of plan data; a piece of plan data whose "time limit" precedes the date designated by the date counter 32; a piece of plan data for a plan having no time limit; and a piece of plan data whose "time limit" is the same as designated by the date counter 32. For the discrimination, the field of "priority order" is inversely displayed as "<!>" in a case where the piece of plan data having "time limit" previous to the designated date; it is displayed as "<1>" or "<2>" in a case of the piece of plan data for the plan having no time limit; or it is displayed as "[1]" or "[2]" in a case of the piece of plan data having a "time limit" corresponding to the designated date. Having been marked in the above-mentioned manner, the piece of plan data whose "time limit" precedes the designated date, the piece of plan data for the plan having no time limit, and the piece of plan data whose "time limit" corresponds to the designated date are displayed in this order. In cases where a plurality of pieces of plan data ere stored as one kind of piece of plan data, the pieces of plan data having "time limit" previous to the designated date are displayed in order of "time limit" the pieces of plan data for plans having no time limit ere displayed in order of "priority order" and the pieces of plan data having "time limit" corresponding to the designated date are displayed in order of "priority order".

For displaying the piece of plan data whose "time limit" corresponds to the next day to the date displayed by the display device 8, the forward key 65 is pressed. Then, it is detected whether the forward key 65 is pressed at step S32; the date in the date counter 32 is advanced by one day at step S33; and the process returns to step S23. If it is detected that the forward key 65 is pressed at step S32 under the condition where the display D21 of FIG. 9 appears, a display D22 of FIG. 9 appears at step S31. That is, the field of "time limit" displayed in the first line is changed from "JAN 8, 1992 (WED)" to "JAN 9, 1992 (THU)". Accordingly, a piece of plan data whose "time limit" corresponds to JAN 9th, 1992 will be displayed from the second line. Herein, neither piece of plan data whose "time limit" precedes the designated date nor piece of plan data for a plan having no time limit will be displayed.

If the forward key 65 is pressed once more when the display D22 appears, a display D23 appears. That is, nothing is displayed from the second line, indicating that there are no pieces of plan data whose "time limit" corresponds to JAN 10th, 1992.

For displaying a piece of plan data whose "time limit" corresponds to the day previous to the date displayed by the display deice 5, the backward key 66 is pressed. Then, it is detected whether the back-ward key 66 is pressed at step S34; the date in the date counter 32 is reduced by one day at step S35; and the process returns to step S23. If it is detected that the backward key 66 is pressed at step S32 when the display D23 of FIG. 9 appears, a display D24 of FIG. 9 appears by the display device 5 at step S31. That is, the date displayed in the first line is changed from "JAN 10, 1992 (FRI)" to "JAN 9, 1992 (THU)". Accordingly, the piece of plan data whose "time limit" corresponds to JAN 10th 1992 will be displayed from the second line.

Figure 10:
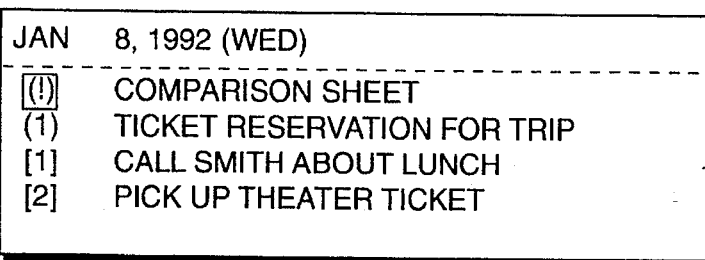
FIG. 10 is another view exemplarily showing how a display is changed according as the daily display function of the electronic notebook of FIG. 1 proceeds.
Figure 10:
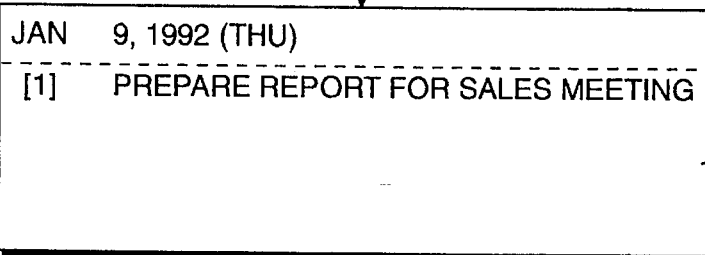
Figure 10:
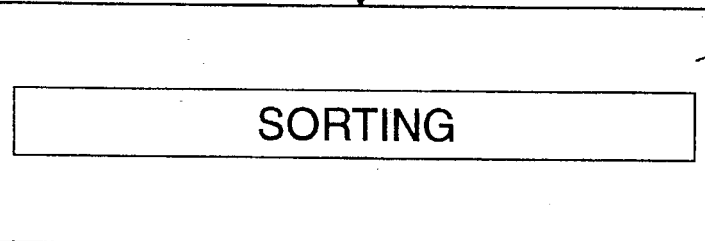
Figure 10:
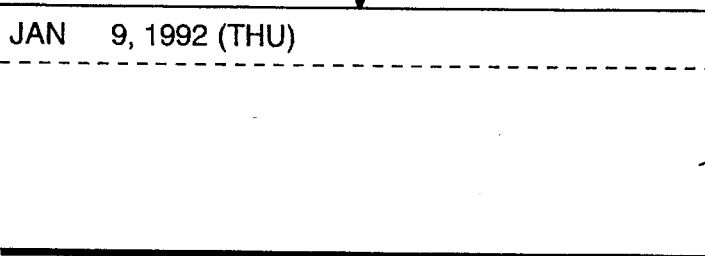
Figure 10:
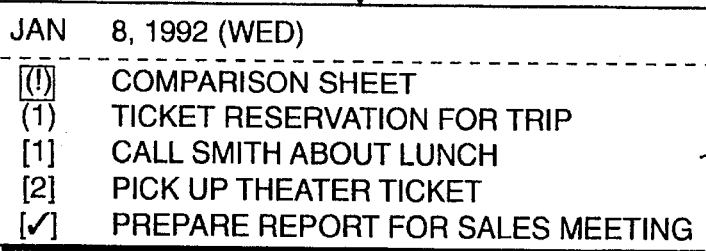

Next, a case for displaying a piece of plan data having been through the above-mentioned checking operation utilizing the daily display function will be described referring to FIG. 10.

As has been described referring to FIG. 9, in a case where the daily display key 61c and the forward key 65 are pressed in this order, the display D22 appears. For example, in order to subject the piece of plan data displayed in the display D22 to the checking operation, the checking operation key is pressed under the condition where the display D22 appears. In cases where plural pieces of plan data are displayed in a single display, some of them are selected for the checking operation, and then the checking operation key is pressed. As a result, in accordance with the flow chart of FIG. 5, the contents of the field of "priority order" are written into the mark indicating that the plan has been transacted; and the contents of the field of "time limit" are written into a day set in the clock functioning section, i.e., a day when the plan was actually transacted, herein from Jan. 9, 1992 into Jan. 8, 1992.

Therefore, in accordance with the flow chart of FIG. 8, the piece of plan data having been through the checking operation is displayed by calling the day when the plan was actually transacted. According to the present example, when the checking operation has been completed, a display D26 appears, where the piece of plan data which was displayed in the display D22 will not be displayed. When the backward key 66 is pressed under the condition where the display D26 appears, a display D27 appears, where the piece of plan data having been through the checking operation is displayed with the mark indicating that the plan has been transacted. In this case, it is determined that the piece of plan data having been through the checking operation has the lowest "priority order", so that it is displayed later than the other pieces of plan data whose "time limit" corresponds to Jan. 8, 1992. Furthermore, instead of the field of "priority order", the mark indicating that the plan has been transacted is displayed on the left side of the piece of plan data.

In cases where the weekly display function is utilized in order to display the piece of plan data having been through the checking operation, the same process will be executed as discussed above except that the date counter designates a week instead of a day.

Thus, with such a simple operation, it is possible to display not only the piece of plan data whose "time limit" corresponds to the designated date, but also a piece of plan data whose "time limit" precedes the designated date and a piece of plan data for a plan having no time limit, utilizing the daily display function or the weekly display function. As a result, a piece of plan data whose "time limit" precedes the designated date and for which the plan is left unattended can be confirmed without calling a time for the "time limit" and a piece of plan data for a plan having no time limit can also be confirmed each time, utilizing the daily display function or weekly display function.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A compact electronic apparatus, comprising:

a storage means for storing a piece of plan data for each plan;

a display means for displaying the piece of plan data for each plan;

an input device operable to indicate that a plan has been transacted; and a data changing means responsive to operation of the input device for causing a mark to be included in the displayed piece of plan data so as to indicate that the plan has been transacted, and for causing time data which corresponds to a time when the plan is actually transacted to be included in the displayed piece of plan data.

2. A compact electronic apparatus according to claim 1, wherein the piece of plan data includes priority data regarding a priority order of the plan; and the data changing means changes the priority data into the mark, so that the displayed piece of plan data includes the mark.

3. A compact electronic apparatus according to claim 1, wherein the piece of plan data includes time limit data regarding a time limit for the plan; end the data changing means changes the time limit data into the time data, so that the displayed piece of plan data includes the time data.

4. A compact electronic apparatus according to claim 1, wherein the piece of plan data includes priority data regarding a priority order for the plan and time limit data regarding a time limit for the plan; and the data changing means changes the priority data into the mark, and changes the time limit data into the time data, so that the displayed piece of plan data includes the mark and the time data.

5. A compact electronic apparatus according to claim 1, wherein the time data corresponds to a time when the time data is caused to be included in the displayed piece of plan data.

6. A compact electronic apparatus, comprising:

a storage means for storing input data for each item, the input data including time data regarding a time of the item; and input means for inputting the data into the storage means and for selecting a prescribed period;

a display means; and a controller responsive to the input means for causing the display means to display (1) the input data having time data which corresponds to the prescribed period having a particular duration and (2) the input data having time data which corresponds to a period previous to the prescribed period.

7. A compact electronic apparatus according to claim 6, further comprising a data changing means for causing a mark to be included in the displayed piece of input data so as to indicate that the item is a particular one.

8. A compact electronic apparatus according to claim 6, wherein the piece of input data for each item is a piece of plan data for each plan.

9. A compact electronic apparatus according to claim 6, wherein the prescribed period is one day.

10. A compact electronic apparatus according to claim 6, wherein the prescribed period is one week.

11. A compact electronic apparatus, comprising:

a storage means for storing a piece of input data for each item, the piece of input data arbitrarily including time data regarding a time for each item;

input means for inputting the piece of input data for each item into the storage means and for selecting a prescribed period;

a display means;

a controller responsive to the input means for causing the display means to display at least two of (1) a piece of input data having time data which corresponds to a prescribed period having a particular duration, (2) a piece of input data having time data which corresponds to a period previous to the prescribed period, and (3) a piece of input data having no time data.

12. A compact electronic apparatus according to claim 11, further comprising a data changing means for causing a mark to be included in the displayed piece of input data so as to indicate that the item is a particular one.

13. A compact electronic apparatus according to claim 11, wherein the piece of input data for each item is a piece of plan data for each plan.

14. A compact electronic apparatus according to claim 11, wherein the prescribed period is one day.

15. A compact electronic apparatus according to claim 11, wherein the prescribed period is one week.

16. A compact electronic apparatus according to claim 11, wherein the display means displays a sign for discriminating whether the piece of plan data includes the time data.

17. An electronic apparatus according to claim 11, wherein the input data includes priority data indicative of an order of priority.

18. An electronic apparatus according to claim 17, wherein the priority data includes a visual indication of whether the input data has time data which corresponds to one of the prescribed period, the period previous to the prescribed period, and no time data.

19. An electronic apparatus according to claim 18, wherein the visual indication is different bracketing symbols surrounding the priority data.

20. An electronic apparatus for scheduling activities, the apparatus comprising:

a memory for storing records, each record including information for a corresponding scheduled activity;

a display which uses records in the memory for generating display frames, including a frame of scheduled activities which are scheduled for a designated time period;

an input device for inputting the designated time period and for selectively storing in the memory a code that indicates that a selected scheduled activity has been completed;

a controller which, upon inputting of the code that indicates that the selected scheduled activity has been completed, modifies the record for the selected scheduled activity so that the selected scheduled activity is displayable in a display frame for an input-implemented time period in which the code was entered.

* * * * *